(12) United States Patent
Olson et al.

(10) Patent No.: US 6,199,121 B1
(45) Date of Patent: Mar. 6, 2001

(54) HIGH SPEED DYNAMIC CHAINING OF DMA OPERATIONS WITHOUT SUSPENDING A DMA CONTROLLER OR INCURRING RACE CONDITIONS

(75) Inventors: Steven E. Olson; Jhy-Ping Shaw, both of San Jose, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/130,885

(22) Filed: Aug. 7, 1998

(51) Int. Cl.$^7$ ................................................ G06F 13/00
(52) U.S. Cl. ............................................ 710/24; 710/126
(58) Field of Search .......................... 710/22–29, 33–35, 710/126, 128, 129

(56) References Cited

U.S. PATENT DOCUMENTS

| | | | |
|---|---|---|---|
| 5,251,303 | 10/1993 | Fogg, Jr. et al. | 395/275 |
| 5,251,312 | 10/1993 | Sodos | 395/425 |
| 5,367,639 | 11/1994 | Sodos | 395/275 |
| 5,386,532 | * 1/1995 | Sodos | 710/22 |
| 5,388,237 | * 2/1995 | Sodos | 710/22 |
| 5,513,368 | * 4/1996 | Garcia, Jr. et al. | 710/22 |
| 5,713,044 | 1/1998 | Gillespie et al. | 395/842 |
| 5,884,050 | * 3/1999 | Wheeler et al. | 710/107 |
| 5,905,912 | * 5/1999 | Story et al. | 710/27 |
| 5,923,896 | * 7/1999 | Young | 710/5 |

* cited by examiner

*Primary Examiner*—David A. Wiley
(74) *Attorney, Agent, or Firm*—Townsend and Townsend and Crew LLP

(57) ABSTRACT

A method and apparatus for dynamic chaining of DMA operations that includes a count to keep track of control blocks associated with such operations when appended to a current chain of control blocks. The count is checked by a DMA controller upon completing the data-transfer operation associated with each block or each control-block chain depending on the use of a wait bit. Memory used to hold control blocks may be preallocated with anticipated control blocks associated in a predefined linked list to avoid the need for subsequently updating existing control blocks when new blocks are appended to a chain.

13 Claims, 10 Drawing Sheets

HIGH SPEED DYNAMIC CHAINING OF DMA OPERATIONS WITHOUT SUSPENDING A DMA CONTROLLER OR INCURRING RACE CONDITIONS

BACKGROUND OF THE INVENTION

The invention relates to the field of direct memory access ("DMA") and, in particular, to dynamic chaining of DMA operations.

DMA operations facilitate transference of data from a source (e.g., a memory, input/output (I/O) device, etc.) to a destination (e.g., another memory, I/O device, etc.) without requiring a host processor to control the data transfer itself. Transfers may be between like or different device types (e.g., memory-memory, memory-I/O device, etc.). In a DMA operation, the host processor initially provides information to a DMA controller (also referred to as a "Bus Master") specifying the parameters of a data-transfer operation (e.g., the address of a block of data to be transferred, the amount of such data, the destination address, etc.; referred to collectively herein as "data-transfer parameters"). The DMA controller, thereafter, handles the actual data transfer.

When performing DMA operations, the DMA controller gains control of an interconnecting bus (or busses) between the source and destination devices. The controller receives data-transfer parameters from a host processor and notifies the processor when the operation has been completed. One well-known method for conveying data-transfer parameters between a processor and DMA controller is through "channel control blocks" or "descriptors" (referred to herein as "control blocks"); i.e., data structures created by the processor, stored in a memory and accessed by the DMA controller for effecting a particular DMA operation.

To facilitate the execution of multiple DMA operations in succession, it is known to "chain" such operations together by constructing a linked list of corresponding control blocks. The linked list may be created through memory addresses; i.e., each block contains the address of the block disposed immediately subsequent in the chain. (Such memory address is referred to herein as a "link address," a "next control block pointer" or simply a "block pointer.") In conventional designs, a "chain bit" may be held in each control block to indicate whether a block currently undergoing processing is linked to a subsequent block. Under such circumstances, the host processor may be required to poll this bit to determine whether a chaining operation is to be carried out. Such polling may contribute to bus traffic in the system.

Often, while a DMA controller is performing a data transfer operation specified by a particular control block, the host processor specifies additional data transference operations by creating additional control blocks. When additional control blocks are created, it is desirable to append the new control blocks to the existing linked list of control blocks to allow the DMA controller to process all the control blocks in one uninterrupted sequence of data-transfer operations. Without the ability to append such control blocks, the DMA controller will deactivate upon completion of the data-transfer operation specified by the original linked list. Then, the host processor will need to restart the DMA controller to handle the data transfer operation specified by the new group of control blocks. Such operation of deactivating and restarting the DMA controller may result in significant time delays and should be avoided when possible.

The appending of control block(s) to an existing block (or linked-list of blocks) before a corresponding DMA operation is complete is referred to herein as dynamic chaining of DMA operations ("dynamic DMA chaining"). Linked lists of control blocks (also referred to herein as "chains" or "control-block chains") that allow such appending of additional control blocks are considered "dynamic". In contrast, chains that are defined prior to the start of a corresponding DMA operation and cannot be appended to before such operation is complete are considered "static".

The transfer of high-speed streaming data (such as audio data in DVD or CD-ROM technologies) requires frequent dynamic DMA chaining. At least one known implementation of dynamic DMA chaining, however, suffers from poor performances as the DMA controller actually suspends operations during the chaining process in order to prevent race conditions. The term "race condition" as used herein, refers to a situation where data (i.e., a control block) can be inadvertently omitted from its intended position within a given sequence of data transference operations (and thereby missed during processing) due to the timing of at least two events. Such condition may arise, for example, when a current control block in a chain is processed before new block(s), intended to be processed before the current block, can be timely inserted in the current control-block chain. Accordingly, it would be desirable to facilitate dynamic chaining of DMA operations without suspending the controller or incurring such race conditions.

In another known implementation of dynamic DMA chaining, a DMA controller must access a memory twice to fetch and update information held in a given control block at least each time dynamic DMA chaining occurs. The update is to obtain the block pointer of appended block(s) for a current block being processed. It would be further desirable to reduce or eliminate the need to provide such frequent updates of block pointers.

SUMMARY OF THE INVENTION

In accordance with the present invention, a method and apparatus is provided for dynamic chaining of DMA operations without suspending a DMA controller or incurring race conditions. Certain embodiments of such method and apparatus also reduce or eliminate the need for updating a block pointer of a control block being processed.

In one embodiment, a system for transferring data is provided which includes a data bus and a controller that effects a transfer of data on the data bus, such controller operating in accordance with a current control block containing data-transfer parameters. The system also includes a processor coupled to the controller, such processor providing one or more new control blocks while the controller is effecting the transfer of data in accordance with the current control block, such one or more new control blocks being accessed by the controller after the current control block. Additionally, disposed within the controller is a counter which maintains a current count associated with the one or more new control blocks.

In another embodiment, a method is provided for performing a data transfer under the control of a DMA controller. This method includes the preallocating of a portion of memory to hold a plurality of anticipated control blocks, the plurality of such control blocks being associated through a predefined linked list. In addition, the method includes generating an initial control-block chain from a first portion of the anticipated control blocks; transferring data in accordance with data-transfer parameters disposed in the initial control-block chain; checking a count value to determine whether any other control blocks in another control-block chain are awaiting processing after effecting data transfer in accordance with the initial control-block chain; and continuing data transfer when the count value indicates other control blocks are awaiting processing, and otherwise waiting for the other control blocks to be generated.

In yet another embodiment, a system for transferring data is provided which includes a memory that holds a plurality of complete control blocks, the plurality of such control blocks being organized into a plurality of control-block chains. Also included are a device (coupled to the memory) which is capable of storing data; a DMA controller that effects a transfer of data between the memory and the device, such controller operating in accordance with one of the plurality of complete control blocks; and a counter, disposed in the DMA controller, that contains a count indicating a quantity of remaining control-block information to be processed.

A further understanding of the nature and advantages of the invention may be realized by reference to the remaining portions of the specification and drawings.

DESCRIPTION OF THE SPECIFIC EMBODIMENTS

With reference to FIGS. 1A through 6B, specific embodiments of the invention will now be described. These embodiments are described primarily with reference to block diagrams and flow charts. As to the flow charts, each block within the flow charts represent both a method step and an apparatus element for performing the method step. Herein, the apparatus element may be referred to as a means for, an element for, a unit for, or a particular device for (e.g., DMA controller, microprocessor, etc.) performing the method step. Depending upon the implementation, the apparatus element, or portions thereof, may be configured in hardware, software, firmware or combinations thereof. As to the block diagrams, it will be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

A. SYSTEM OVERVIEW

Figure 1A:
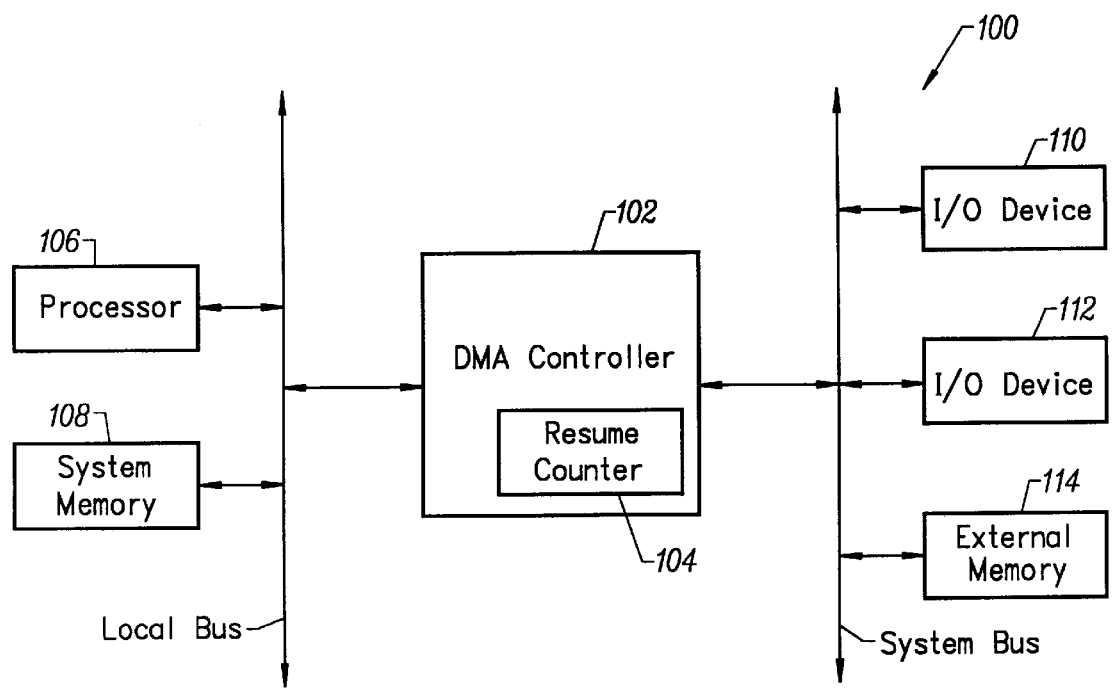
FIG. 1A is a block diagram of a system incorporating a DMA controller in accordance with an embodiment of the invention.

FIG. 1A illustrates a computer system 100 in accordance with the present invention having a microprocessor 106 and a DMA controller 102 which handles transference of data between a system memory 108 and an external memory 114 or I/O devices 110 and 112. DMA controller 102 also facilitates transference of data between I/O devices such as devices 110 and 112. Memories 108 and 114 as shown in FIG. 1A include both storage and memory-controller circuitry.

DMA controller 102 processes data-transfer operations specified by control blocks arranged in linked lists or chains. The terms "chain" or "control-block chain" as used herein refer to control blocks associated by a linked list. The entire linked list or chain of control blocks facilitating an uninterrupted DMA operation may, as discussed below, be created piecemeal through a number of smaller chains (i.e., subsets of the entire linked list) linked together dynamically during DMA operations. DMA controller 102 keeps track of the remaining control blocks or control-block chains awaiting processing through a counter identified as resume counter 104 in FIG. 1A.

Although not shown in FIG. 1A, but as would be understood by those having ordinary skill in the art, DMA controller 102 also contains conventional processing circuitry (e.g., a state machine) for carrying out DMA operations and storage circuitry (e.g., registers) for holding data and control information to facilitate device interface and DMA operations. For example, a "start bit" is maintained in a register within controller 102 which is set by microprocessor 106 to initiate a data transfer by controller 102.

1. Microprocessor 106

Microprocessor 106, as described below, creates control blocks and stores them in a memory such as system memory 108. Control blocks and control-block chains are created by microprocessor 106 in accordance with at least two different methods. In the first method, a comprehensive set of control blocks are initially created as data structures in memory; each block containing only a portion of the data necessary to facilitate data transfer operations. Such blocks are referred to herein as "anticipated control blocks". Although each block is incomplete, the comprehensive set represents and identifies all the individual control blocks anticipated to be required by the DMA controller.

Microprocessor 106 preallocates a portion of memory 108 to hold the set of anticipated control blocks. Each anticipated block includes a block pointer identifying the address within memory 108 of the next control block within the comprehensive set of control blocks (except for the last block in the set which may contain any address). Accordingly, this set of control blocks is configured as a complete linked list for all control blocks that will be used in the computer system. Since this linked list is created in advance of actual use, it is referred to as a "predefined linked list". (In an alternative embodiment, the predefined linked list may initially contain only a portion of the complete set of control blocks; such linked list being updated with additional anticipated control blocks when necessary.) During operation, processor 106 will select and complete subsets of control blocks from the predefined linked list forming control-block chains that contain the necessary information to instruct DMA controller 102 to carry out data transfer operations.

In the second method, microprocessor 106 newly creates complete control blocks in control-block chains. Like the first method, each newly-created control block includes a block pointer identifying the address within memory 108 of a data structure containing the next control block within the chain (except for the last block in a chain which may contain any address). Unlike the first method, however, each newly-created control block in this second method also contains the remaining data-transfer parameters necessary to carry out data-transfer operations; i.e., each new block is "complete."

Significantly, control blocks created in either method are presumed to operate in a "chain" mode. Hence, these control blocks do not require a so-called "chain bit" (as mentioned above in connection with the prior art) to indicate whether a chaining operation is to be carried out. As a result, processor 106 need not commit resources to poll for a chain bit and system bus traffic is potentially reduced to the extent such polling would be carried out.

Microprocessor 106 facilitates the appending of one or more control-block(s) to an existing control block or control-block chain while the DMA controller is undergoing data-transfer operations. This operation is carried out under the direction of software (i.e., a driver), whose functionality is described in more detail below. Upon appending control block(s), microprocessor 106 typically need only increment a count in resume counter 104 (disposed within DMA controller 102; FIG. 1A) to indicate that the number of remaining control blocks (or control-block chains) requiring processing has been increased (although some additional processing, as described below, may be required when the controller is processing the last control block of a chain while the processor is concurrently appending new control block(s)). Significantly, the controller operation is not suspended to facilitate such dynamic DMA chaining.

In accordance with the present invention, driver design is simplified since the processor need not synchronize with the controller. Instead, the controller operates in response to the count which is incremented asynchronously by the processor.

2. DMA Controller 102

Also as described below, DMA controller 102 facilitates DMA operations in response to the control block(s) created by microprocessor 106 and count contained in resume counter 104. Controller operation may be directed through hardware (e.g., a state machine), software or any other conventional method. DMA controller 102 relies on the count held in counter 104 to determine the quantity of DMA operations remaining to be performed. Significantly, any block(s) awaiting processing as reflected in the count are complete and ready to be accessed. Depending upon the embodiment, the count may represent the number of remaining control block(s) or, instead, the number of remaining control-block chain(s).

The DMA controller is permitted to continue data-transfer operations during a chaining process with minimal disruption through the use of counter 104, which provides a mechanism (i.e., the count) to track the appending of new block(s). Using the count, most new control blocks may be appended to an existing chain without the need to update the block pointer of the control block that is currently undergoing processing in the controller. Rather, the controller is advised of such appending through an increment to the count (and any actual "update" to a control block is handled in memory).

Moreover, in accordance with at least two embodiments of the invention described below, block pointers are pre-defined in a control-block set prior to processing thereby eliminating the need for any such updates in the controller altogether. In other embodiments, any such updating of control blocks in the controller may be reserved exclusively for the relatively less frequent situation where the appending of the new control blocks coincides with the processing of the final control block in a chain.

As described below in connection with the flow charts, controller 102 periodically checks the status of the count during DMA operations. If the count indicates control block (s) remain to be processed, then DMA operations will continue uninterrupted by controller 102. However, if the count indicates no control block(s) remain to be processed, the controller will transition to a "wait state" upon completing its current DMA obligations. Upon entering the wait state, DMA operations cease until new control block(s) are received for a new DMA operation. Such procedure avoids race conditions since the DMA controller operates sequentially (i.e., according to existing chain(s)) until no more block(s) are available for processing; i.e., upon reaching data starvation.

Should system-induced processing delays create the situation where a control-block chain is completed before additional control block(s) (intended to be part of the chain) can be appended to the chain, then the DMA controller will again enter its "wait state," which serves to minimize this disruption to operation. During the wait state, when new block(s) are created and the microprocessor increments the count to indicate their availability (as described below), the controller will respond by resuming DMA operations and thereby automatically terminating the wait state. In such operations, the additional control blocks are appended to the chain at their intended position within the sequence of data transference operations and processed thereafter. Transitioning in and out of the wait state is an extension of normal DMA controller operations and requires no modification to processor operations.

Conflicts between reading and writing the count are eliminated through standard arbitration protocols such as semaphores.

3. Alternative System Embodiment

Figure 1B:
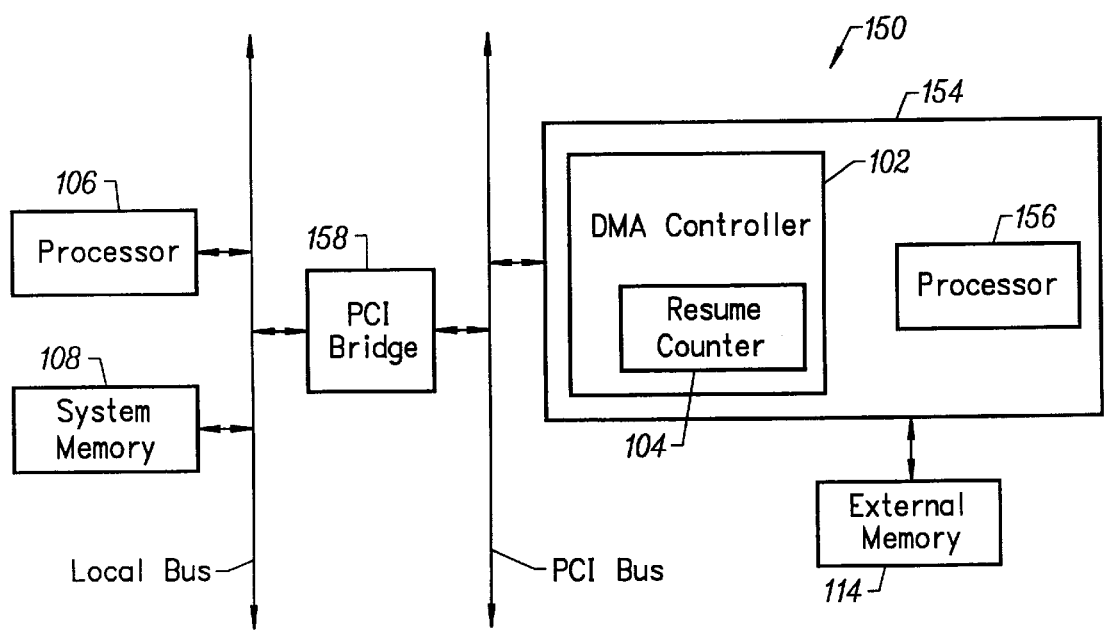
FIG. 1B is a block diagram of a system incorporating a DMA controller and PCI bus in accordance with an alternative embodiment of the invention.

An alternative embodiment of system 100 that includes a PCI bus is shown in FIG. 1B. Referring to FIG. 1B, like reference numerals indicate identical or functionally similar elements to those shown in FIG. 1A. In system 150 of FIG. 1B, DMA controller 102 is disposed within an interface unit 154, which may also contain a separate interface processor 156. This processor may carry out the processor operations described above in connection with processor 106 (and as described below in connection with FIGS. 3A, 4A, 5A and 6A).

System 150 also includes a conventional PCI bridge 158, which serves as a host-to-PCI bus interface. System 150 operates essentially in accordance with the foregoing discussion directed to system 100 (FIG. 1A), with an alternative bus structure and alternative processor (i.e., processor 156 taking over the above-noted responsibilities of processor 106). Although not shown in FIG. 1A, I/O units 110 and 112 may be coupled to interface unit 154. Conflicts between reading and writing the count contained in counter 104 of system 150 are eliminated through standard PCI-bus arbitration.

B. CONTROL BLOCK

Figure 2:
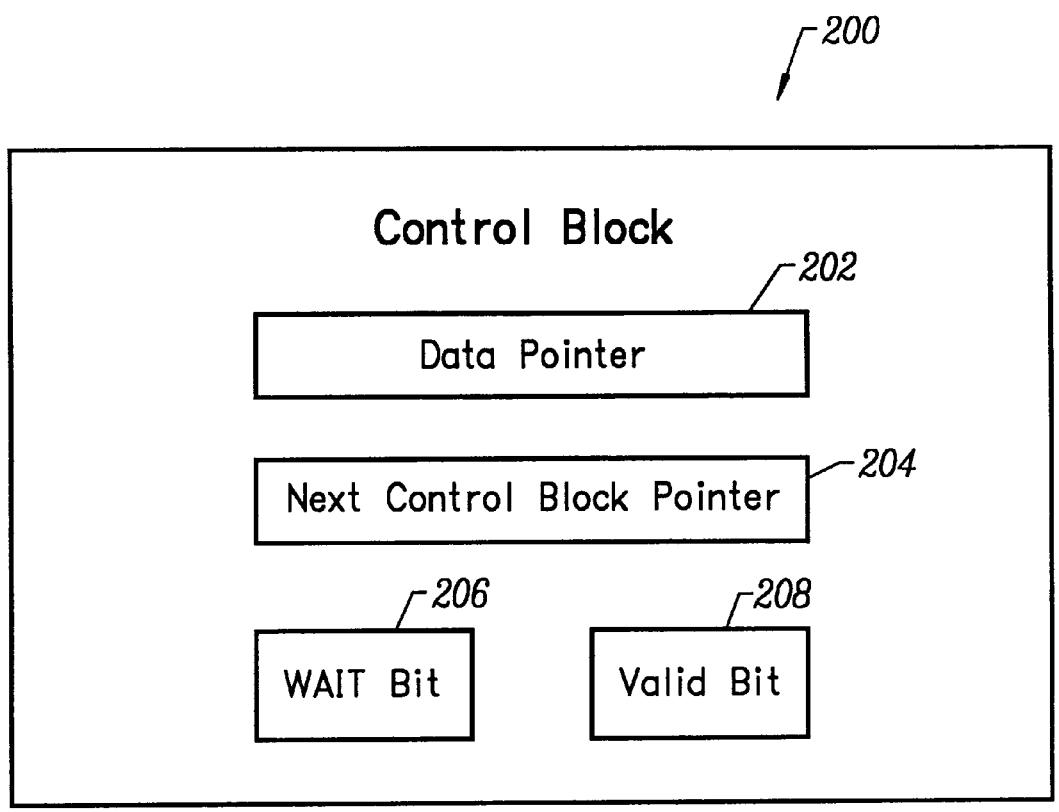
FIG. 2 is a diagram of a control block configured in accordance with an embodiment of the invention.

A control block 200 used by systems 100 and 150 is provided in FIG. 2. As shown, this block contains a data pointer 202, a "next control block pointer" (also referred to as a "block pointer") 204, a wait bit 206 and a valid bit 208. Data pointer 202 provides a starting address of a block of data to be transferred. Block pointer 204 identifies the next control block contained within the linked list of control blocks being processed. Wait bit 206, which is optional (as described below), is used to indicate the last control block disposed within a particular chain. Valid bit 208 is used to confirm that a given link associating two control blocks is indeed valid. Additional information not shown but which may be contained in block 200 includes, for example, the length of the data block to be transferred, the address to which the data is to be transferred and an interrupt bit used to advise the microprocessor when a DMA operation is completed. Only those portions of control block 200 necessary to understand the present invention are shown in FIG. 2.

C. OPERATION

Various methods by which microprocessor 106 (or 156) and DMA controller 102 operate to facilitate dynamic DMA operations will now be described with reference to the flow charts provided in FIGS. 3A–6B. FIGS. 3A, 4A, 5A and 6A represent method steps of microprocessor 106 or 156 while FIGS. 3B, 4B, 5B and 6B represent complementary method steps, respectively, of DMA controller 102. These steps may be performed in parallel as microprocessor 106 (or 156) and controller 102 are separate, asynchronous devices. The embodiments described in connection with FIGS. 3A, 3B, 5A and 5B utilize control block 200 with a wait bit 206. Alternatively, embodiments described in connection with FIGS. 4A, 4B, 6A and 6B utilize control block 200 without a wait bit 206.

Out of convenience, the following discussion references only microprocessor 106. It is to be understood, however, that each operation of microprocessor 106 described herein may also be performed by microprocessor 156. Additionally, reference to "chain" or "control-block chain" in the following discussion refers to data structures held in memory containing one or more control blocks. When a chain contains only a single block, that block is treated as the first and last control block of the subject chain for purposes of the following discussion. When a chain contains a plurality of blocks, such blocks are associated in a linked list for purposes of the following discussion.

Figure 3A:
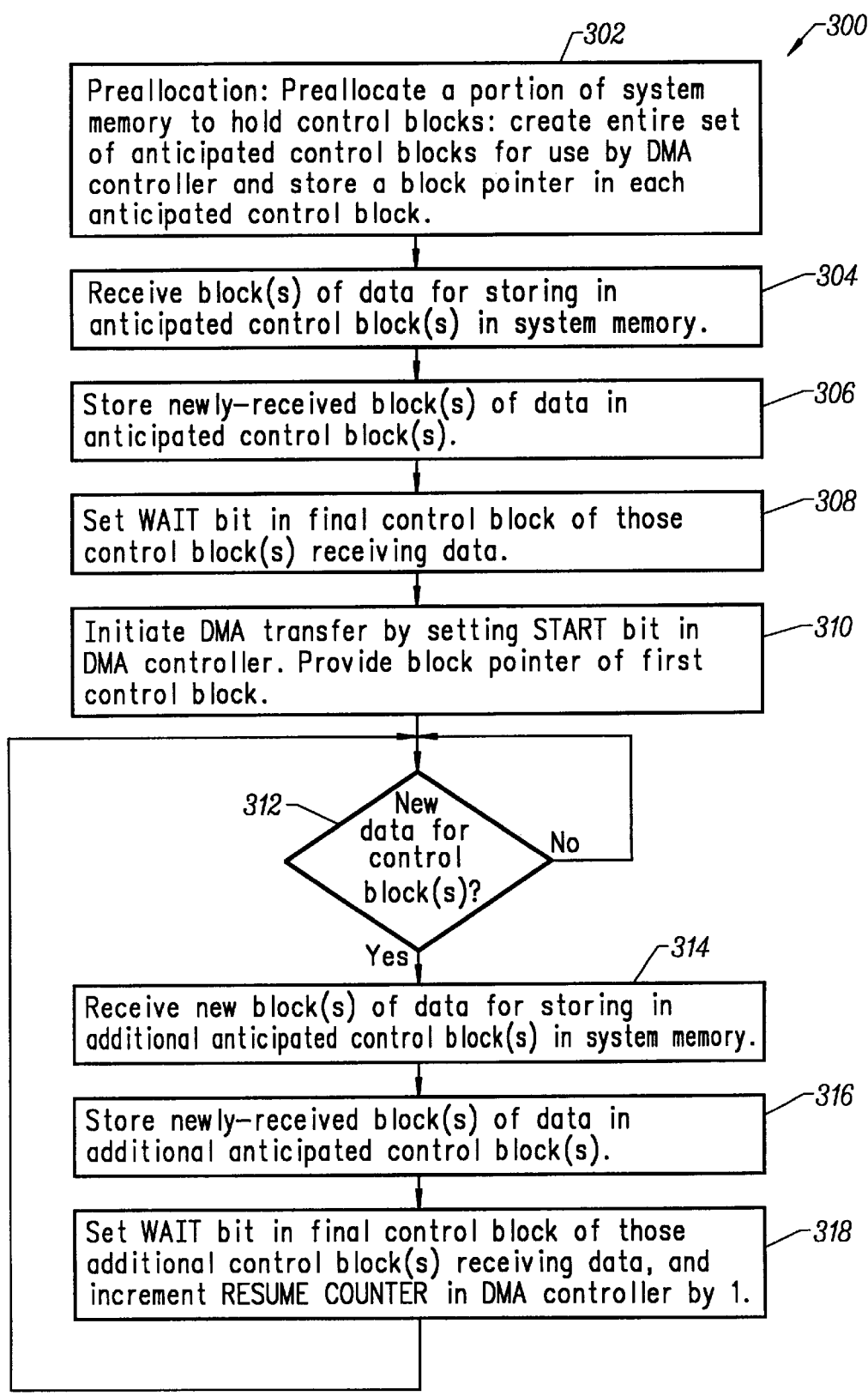
FIGS. 3A and 3B are flow charts of processor and DMA operations, respectively, using memory preallocation, a wait bit and resume counter in accordance with an embodiment of the invention.

FIG. 3A illustrates a method 300 carried out by microprocessor 106 to facilitate dynamic DMA chaining in accordance with one embodiment of the present invention. Pursuant to step 302, microprocessor 106 preallocates a portion of system memory 108 to hold a set of incomplete (i.e., "anticipated") control blocks; such blocks representing the entire set of control blocks for use by controller 102. For example, 64 kilobytes of memory may be preallocated to hold 16K control blocks, wherein each block holds 4 bytes of information. These anticipated control blocks are not necessarily associated with any data to be transferred at the time they are created. Rather, the blocks are created in anticipation of such data.

The complete set of control blocks created in step 302 form a predefined linked list; i.e., each block initially contains a block pointer identifying the next control block in the list. As described below, subsets of this linked list will be selected by microprocessor 106 individually or in groups and appended dynamically to an existing control-block chain during the course of DMA operations. The use of a predefined linked list as set out herein avoids the need to update a block pointer within an existing control block during the course of DMA operations. More specifically, there is no need to update the block pointer of a final control block in a chain when additional control block(s) are appended thereto.

Referring again to FIG. 3A, microprocessor 106 next proceeds to step 304 where it receives one or more blocks of data for storing in one or more of the anticipated control blocks being held in system memory 108. Such blocks of data may be read from a magnetic or optical disc, received from an Internet Web site, or obtained from any other source of data. Control next flows to step 306 where the microprocessor stores such newly received block(s) of data in one or more anticipated control block(s) thereby creating "complete" control block(s); i.e., block(s) containing the necessary data to facilitate DMA operations. Such complete control block(s) form a chain created from a subset of the predefined linked list.

In step 308, microprocessor 106 sets wait bit 206 (FIG. 2) in the last control block of the newly created chain. With a chain of complete control block(s) now stored in memory 108, microprocessor 106 initiates DMA transfer by setting a start bit (a conventional control bit maintained in a register within controller 102, as mentioned above) in the DMA controller 102 pursuant to step 310. Also pursuant to this step, processor 106 provides the block pointer of the first control block in the newly created chain to controller 102 to enable the controller to fetch this block.

As the DMA controller begins to perform DMA operations (described in FIG. 3B), microprocessor 106 will turn to other matters including the processing of new data for additional control block(s). Referring again to FIG. 3A, when new data for control block(s) becomes available pursuant to step 312, microprocessor 106 proceeds to step 314 where it receives such new block(s) of data for storing in additional anticipated control block(s) in system memory 108. These additional anticipated control block(s) represent the next control block(s) available in the predefined linked list. Once the data is received, microprocessor 106 stores this newly received data in the additional anticipated control block(s) pursuant to step 316. Finally, proceeding to step 318, microprocessor 106 again sets a wait bit in the final control block of the additional anticipated control block(s) to designate the end of the newly-created chain of complete control block(s). Also pursuant to step 318, microprocessor 106 will increment resume counter 104 (in controller 102) by a value of one to indicate the appending of a new chain to the current control-block chain being processed by DMA controller 102.

Figure 3B:
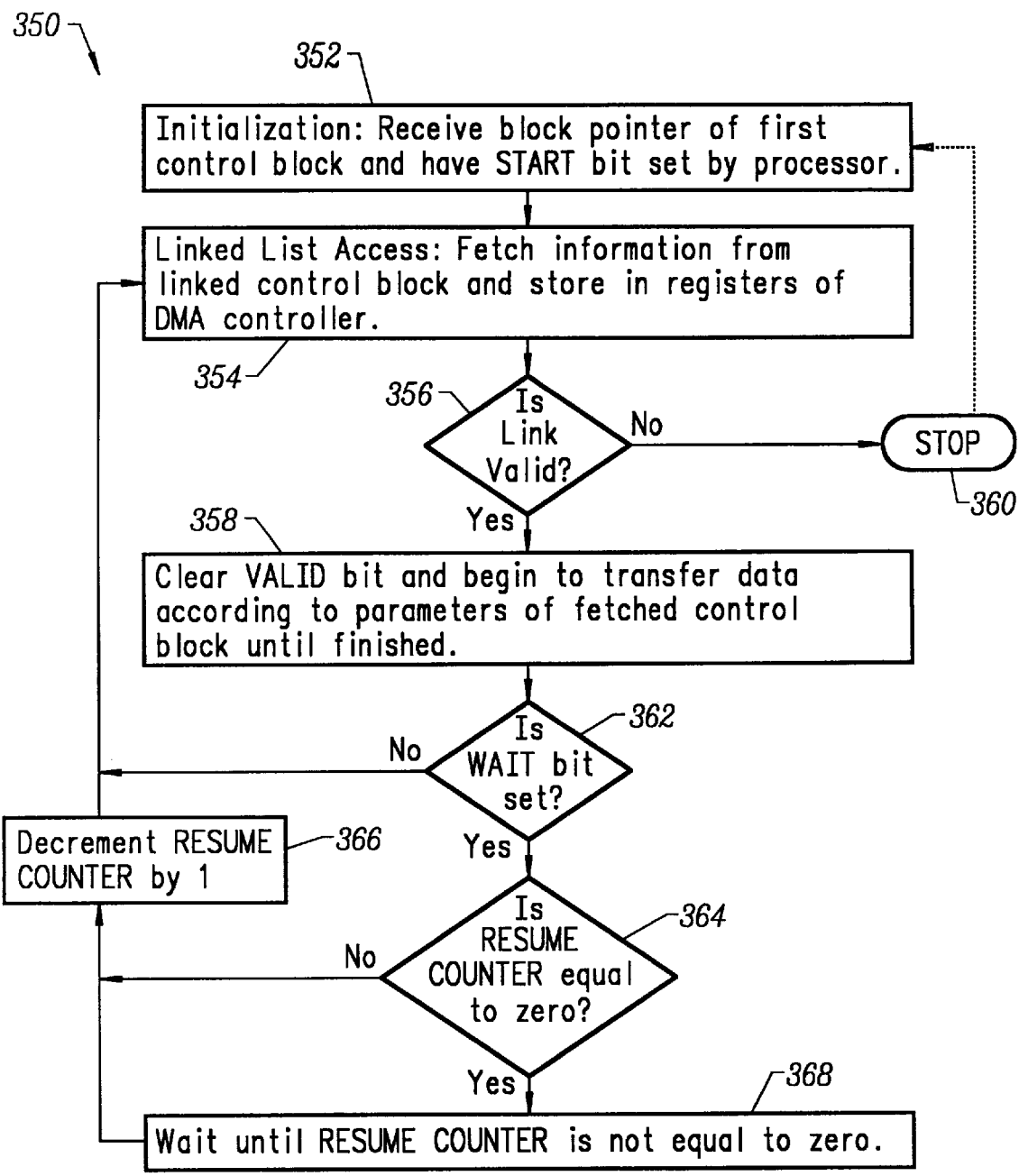

FIG. 3B illustrates a method 350 carried out by DMA controller 102 (in response to certain operations performed in method 300 by processor 106) to facilitate dynamic DMA chaining in accordance with one embodiment of the present invention. Referring to FIG. 3B, controller 102 initiates DMA operations pursuant to step 352 upon the setting of its start bit by microprocessor 106, and receipt of a block pointer of the first control block for the pending DMA operation from the microprocessor.

Controller 102 next proceeds to step 354 where it fetches information held in the control block (in memory 108) associated with the block pointer provided in step 352. This information is stored in conventional registers contained within controller 102 and, as discussed above, sets out the parameters for a particular DMA operation. In connection with the present invention (and referring to FIG. 2), information retrieved from a control block stored in memory 108 and loaded into registers of the DMA controller include a data pointer 202, a block pointer 204, a wait bit 206 and a valid bit 208.

Controller 102 next proceeds to step 356 where it checks the validity of a particular link by examining the valid bit of the current control block. If this link is valid (i.e., the bit is set), then operation will proceed to step 358 as set out in FIG. 3B. However, if the link is invalid (i.e., the bit is reset), then operation stops and DMA controller is suspended pending reinitialization by microprocessor 106. The use of a bit to represent the validity of a given link in a linked list is well known in the art. In this application, however, the bit not only serves as a precautionary test to avoid processing erroneously linked control blocks, but also may be used as a method to intentionally suspend DMA operations. Specifically, if desired by a programmer, processor 106 may be operated to intentionally clear a valid bit in a given control block prior to step 356 to terminate DMA processing by controller 102.

Upon determining that a given link is valid, controller 102 proceeds to step 358 to clear the valid bit and begin transfer of data according to the parameters of the fetched control block until all data has been transferred. As noted above, this data transfer operation is handled by DMA controller 102 thereby freeing up microprocessor 106 to carry out other operations. Once all the data has been transferred for a given control block, controller 102 will examine the wait bit received from the fetched control block to determine whether or not it is set. If this bit is not set, then control flows back to step 354 to retrieve the next linked control block in the current chain of control block(s) being processed. However, if the wait bit is set, this indicates that the end of the current chain of control block(s) has been reached and the controller must now determine whether any additional data transfer operations are pending.

When the wait bit is set, controller 102 proceeds to step 364 to determine whether the resume counter maintains a count equal to zero. If not, then one or more control blocks are pending. In such circumstances, control will flow to step 366 where the count value in resume counter 104 is decremented by a value of one. After which, a new fetching operation begins pursuant to block 354 based upon the block pointer 204 contained in the previously executed control block and held in a register in controller 102.

Conversely, if resume counter 104 does maintain a count of zero, then no pending data transfer operations exist and controller 102 enters a wait state pursuant to step 368. Controller 102 will remain in a wait state until the count value in counter 104 is set not equal to zero. At such time, as indicated in FIG. 3B, the count value will be decremented by one pursuant to step 366 and the next control block will be fetched pursuant to block 354.

As set out in FIGS. 3A and 3B, microprocessor 106 and controller 102 carry out DMA operations using memory preallocation, a wait bit and a resume counter in accordance with one embodiment of the invention. Through memory preallocation, block pointers for an entire set of control blocks are predefined thereby eliminating the need to update these values for a given control block when a control-block chain is newly appended. Moreover, the use of a wait bit 206 enables controller 102 to wait until reaching the end of a chain before determining whether any control blocks have been dynamically appended to an existing control block. Finally, resume counter 104 enables the appending of one or more control-block chains to the existing chain with minimal interruption to controller 102 operations; i.e., by simply incrementing a counter.

Figure 4A:
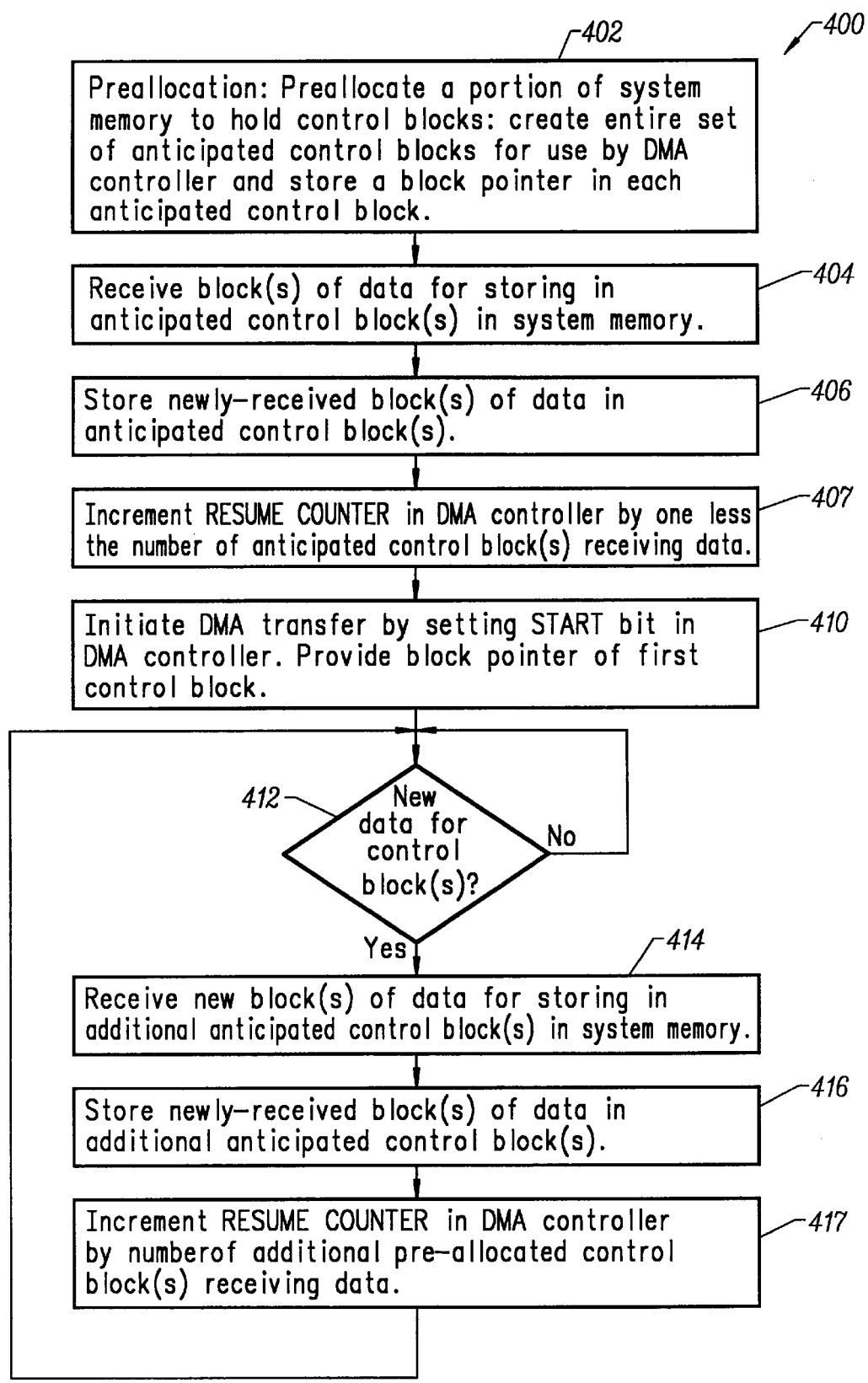
FIGS. 4A and 4B are flow charts of processor and DMA operations, respectively, using memory preallocation and resume counter in accordance with an embodiment of the invention.
Figure 4B:
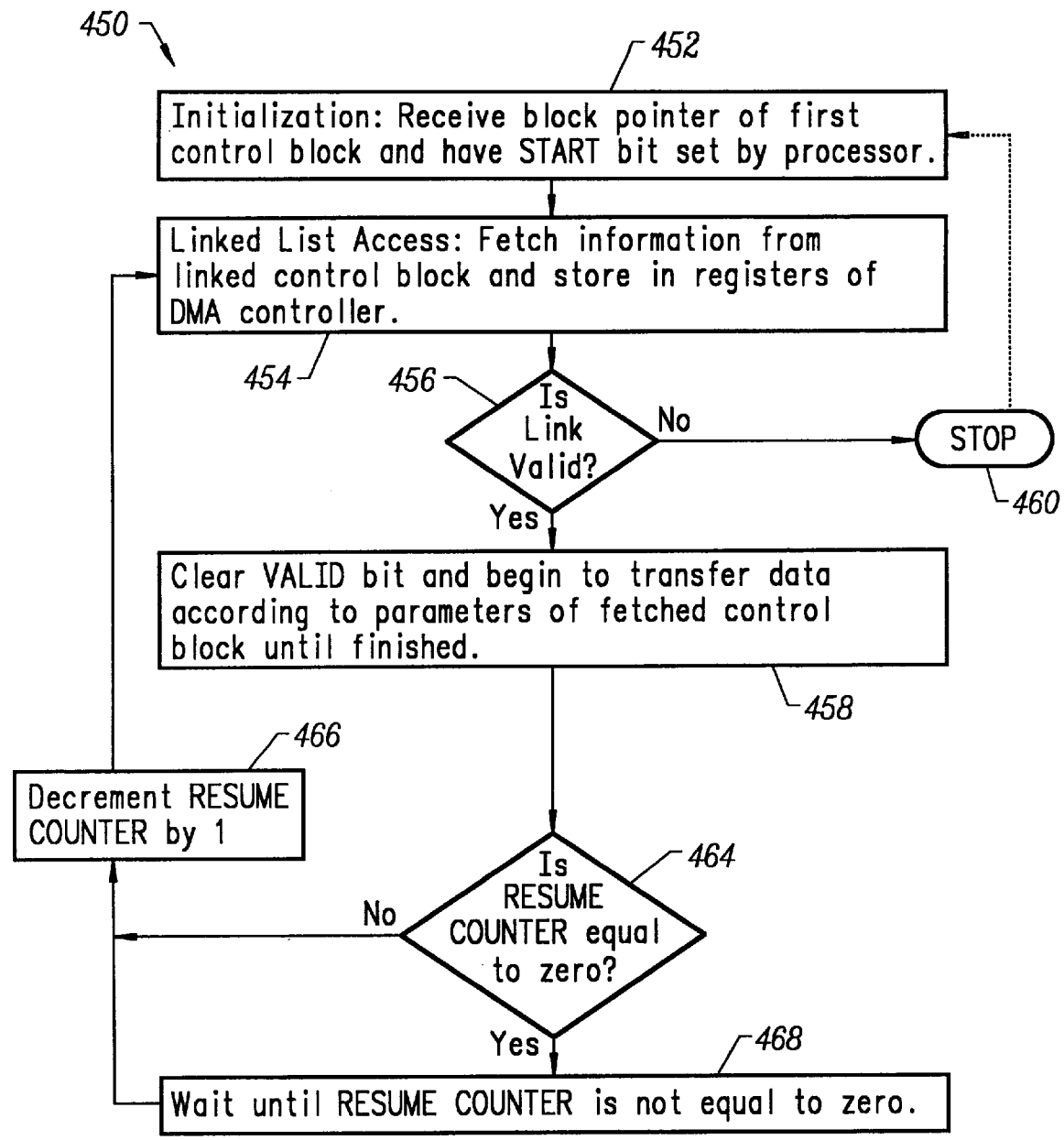

FIGS. 4A and 4B represent methods carried out by microprocessor 106 and DMA controller 102, respectively, to facilitate dynamic DMA chaining in accordance with another embodiment of the invention. These methods are similar to those illustrated in FIGS. 3A and 3B, with the notable exception that FIGS. 4A and 4B omit the use of a wait bit. Accordingly, resume counter 104 maintains a count that tracks individual control blocks rather than control-block chains. Many of the flow-chart steps provided in FIGS. 4A and 4B are identical to those provided in FIGS. 3A and 3B, respectively; such identical steps being identified by like reference numerals incremented by one hundred. The descriptions of these steps provided above with respect to FIGS. 3A and 3B apply equally to those shown in FIGS. 4A and 4B. Hence, only the differences between these two sets of flow charts will be described below.

Referring to method 400 of FIG. 4A, microprocessor 106 operates in a manner nearly identical to that in FIG. 3A with the exception that steps 308 and 318 are deleted and steps 407 and 417 are added. In step 407, microprocessor 106 increments resume counter 104 by a number one less than the quantity of anticipated control block(s) receiving data. Since the first control block is processed by controller 102 before decrementing the count in counter 104 (see FIG. 4B), it is necessary for such value to be one less than the number of control blocks being allocated for initial execution. Once this count is established in counter 104, microprocessor 106 proceeds in accordance with the operation described in FIG. 3A until reaching step 417. This step, like step 407, processes the value of the count in resume counter 104. In this instance, after a new set of complete control block(s) have been generated (i.e., forming a new chain), microprocessor 106 then increases the count maintained by resume counter 104 by the number of additional anticipated control block(s) that are "complete" and are to be appended to the existing control block(s). Once the count is updated, processor 106 will return to step 412 and await new data for creating new control block(s).

Referring to FIG. 4B, DMA controller 102 in this additional embodiment performs the same steps set out in FIG. 3B except for step 362; i.e., determining whether a wait bit is set. Since wait bit 206 (FIG. 2) is omitted from this embodiment, step 362 is deleted and controller 102 must rely upon the count value maintained by resume counter 104 to determine whether any control block(s) remain pending upon completion of a data transfer associated with a given control block. Accordingly, if there is one or more control blocks pending, then pursuant to steps 464 and 466, controller 102 will decrement the count value maintained in counter 104 and fetch the next control block as identified by the current block pointer maintained by controller 102. If no control block remains pending, then controller 102 will again enter a wait state pursuant to step 468 until the resume counter value is set not equal to zero.

In summary, FIGS. 4A and 4B illustrate an alternative embodiment of the present invention where wait bit 206 (FIG. 2) is eliminated from the associated architecture and operation. The elimination of this bit results in more frequent processing of the count maintained in counter 104; i.e., checking this value after completing a data transfer operation associated with every control block and decrementing this value after every such control block except the last.

Figure 5A:
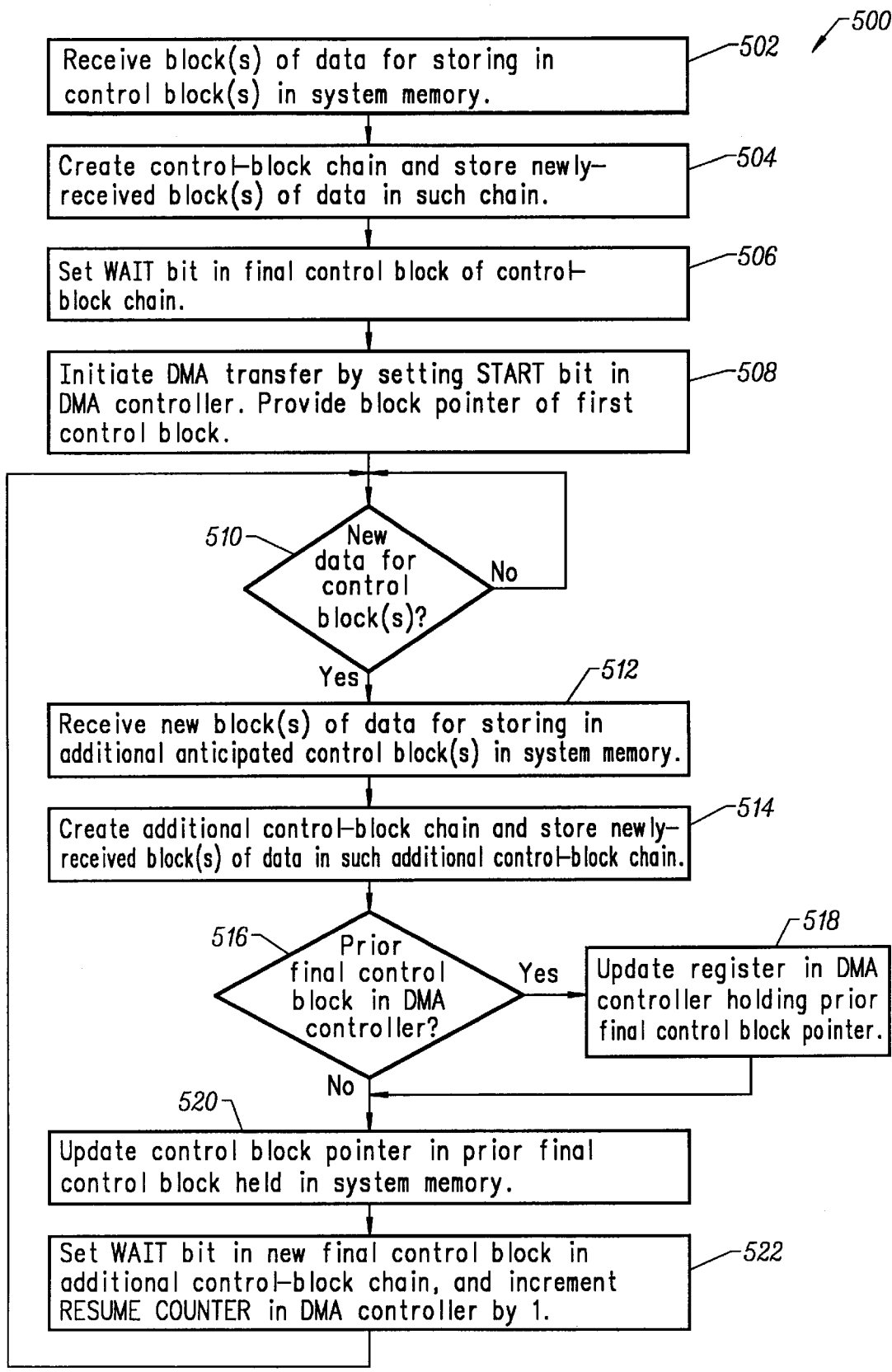
FIGS. 5A and 5B are flow charts of processor and DMA operations, respectively, using a wait bit and resume counter in accordance with an embodiment of the invention.
Figure 5B:
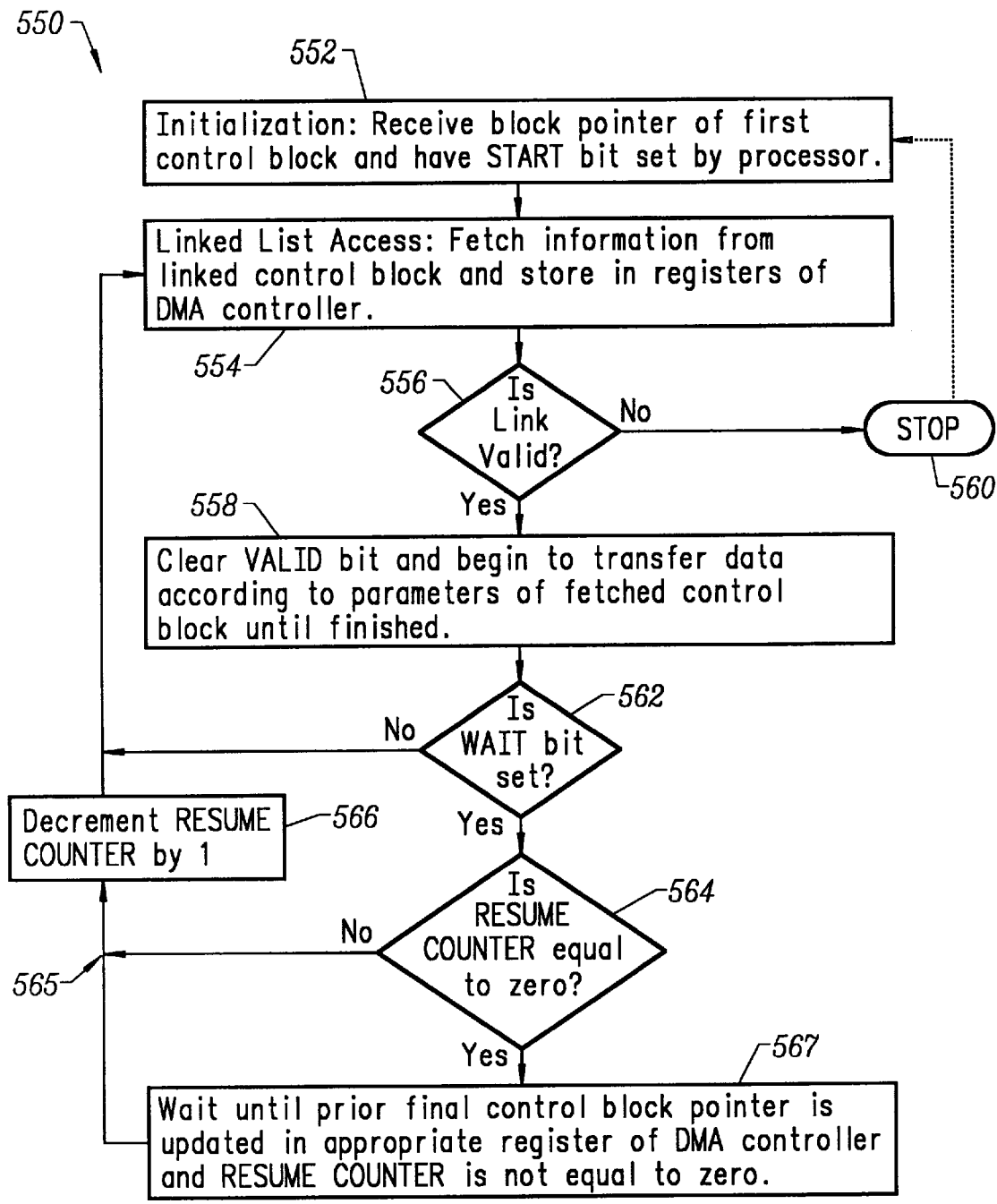

FIGS. 5A and 5B illustrate methods carried out by microprocessor 106 and DMA controller 102, respectively, to facilitate dynamic DMA chaining pursuant to yet another embodiment of the present invention. Unlike the foregoing discussion directed to FIGS. 3A, 3B, 4A and 4B, the embodiment of FIGS. 5A and 5B does not preallocate a portion of system memory to hold anticipated control blocks. Rather, complete control blocks are simply generated as required. Like the discussion directed to FIGS. 3A and 3B, however, the embodiment of FIGS. 5A and 5B utilizes a wait bit and resume counter to facilitate DMA operations in accordance with the invention.

Referring to FIG. 5A, microprocessor 106 initially receives block(s) of data for storing in control block(s) in system memory 108. As described above, these block(s) of data may be read from a magnetic or optical disc, received from an Internet Web site, or obtained from any other source of data. Upon receiving such information, microprocessor 106 creates a control-block chain and stores the newly-received data in such chain pursuant to step 504. Upon creating and linking the control block(s), microprocessor 106 proceeds to step 506 where a wait bit 206 (FIG. 2) in the final control block of the newly-created chain is set to indicate the end of this chain. Upon setting the wait bit, the control-block chain is now ready for access by DMA controller 102.

Microprocessor 106 initiates DMA data transfer by setting the start bit held in DMA controller 102 pursuant to step 508. Also pursuant to this step, processor 106 provides the block pointer of the first control block in the newly-created chain to controller 102 thereby enabling the controller to fetch this block.

As the DMA controller begins to perform DMA operations (described in FIG. 5B), microprocessor will turn to other matters including the processing of new data for additional control block(s). Referring again to FIG. 5A, when new data for control block(s) becomes available pursuant to step 510, microprocessor 106 proceeds to step 512 where such new data is received. Pursuant to step 514, upon receiving such data, microprocessor 106 creates a control-block chain within system memory 108 and stores the newly-received data in such chain.

Since anticipated control blocks are not used in this embodiment, microprocessor 106 must update the block pointer 204 contained in the last control block of the entire chain (including all previously appended chains) currently in existence (referred to herein as the "prior final control block") before incrementing the count to reflect the appending of the new control-block chain created in step 514. Pursuant to step 516, processor 106 determines whether such prior final control block is retained in the DMA controller; e.g., the processor may examine the count and wait bit in controller 102 to determine whether the former is zero and the latter is set. This would be the case if such final control block were being executed by the controller and therefore the control block contents would be retained in registers disposed within controller 102. If the prior final control block is maintained within controller 102, the register holding the block pointer of such control block is updated by microprocessor 106 pursuant to step 518.

Upon updating such register in the DMA controller, or if the prior final control block is not held within the DMA controller, processor 106 proceeds to step 520 where the control block pointer in the prior final control block held in system memory 108 is also updated. The prior final control block is updated in memory as well as in the controller in the event that this linked list (now containing a new, dynamically appended portion) is accessed again by microprocessor 106 for a future DMA operation.

Upon completing the foregoing update procedure, microprocessor 106 proceeds to step 522 of FIG. 5A wherein the wait bit 206 in the new final control block of the newly-generated control-block chain is set to indicate the end of such newly-generated chain. Additionally, resume counter 104 held by controller 102 is incremented by one to reflect the appending of a new control-block chain. Upon completion of step 522, processor 106 awaits further data for new control block(s) pursuant to step 510.

FIG. 5B illustrates a method 550 carried out by DMA controller 102 (in response to certain operations performed in method 500 by processor 106) to facilitate dynamic DMA chaining in accordance with an embodiment of the present invention. This method is nearly identical to that illustrated in FIG. 3B. In fact, most of the flow-chart steps provided in FIG. 5B are identical to those provided in FIG. 3B; such identical steps being identified by like reference numerals incremented by 200. The descriptions of these steps provided above with respect to FIG. 3B apply equally to those shown in FIG. 5B. Hence, only the differences between these two sets of flow charts will be described below.

Referring to method 550 of FIG. 5B, controller 102 operates in a manner identical to that of method 350 in FIG. 3B with the exception that step 368 is replaced with step 567. Referring to FIG. 5B (and as discussed above) upon completing a data transfer pursuant to a final control block in a chain, and determining that the count held in counter 104 equals zero, controller 102 enters a wait state which, in this case, is pursuant to step 567. In this wait state, controller 102 waits for new control block(s) to be generated by processor 106 and appended to the last control block processed. In such instance, the block pointer maintained in a register of controller 102 must be updated to point to a newly-generated control-block chain and thereafter the count in counter 104 is set not equal to zero. At such time, as indicated in FIG. 5B, the count value will be decremented by one pursuant to step 566 and the next control block will be fetched pursuant to block 554.

In an alternative embodiment to the methods shown in FIGS. 5A and 5B, controller 102 may be relied upon to update the block pointer of a "prior final control block" held by controller 102 through a "reread" operation. In such embodiment, steps 516 and 518 are removed from process 500 of FIG. 5A and replaced with a line connecting steps 514 and 520. Control then flows from step 514 directly to step 520 and, thereafter, to step 522 as described above. As a result, the block pointer of the "prior final control block" is updated in memory 108 but not in any register of DMA controller 102. Accordingly, controller 102 must now perform a "reread" operation to update such register in the event the prior final control block is retained in the DMA controller at the time additional control blocks are appended.

Turning to FIG. 5B, method 550 is also revised to accommodate this alternative embodiment. Specifically, a new step is inserted between junction 565 and step 566 which states: "Reread the block pointer (from memory 108) of the block currently being processed." Additionally, step 567 is revised by deleting the current text and inserting the following: "Wait until RESUME COUNTER is not equal to zero." (Referred to hereafter as "revised step 567").

The new step between junction 565 and step 566 (the "New Step") and the revision to step 567 are necessary to address the situation where a prior final control block is retained in the DMA controller at the time new blocks are being appended to the existing chain. Should the appending operation be completed before controller 102 reaches step 564, the count will be incremented (by processor 106) but the register in the DMA controller holding the current block pointer will not be changed. Hence, a reread operation pursuant to the New Step must be performed in the event the block currently being processed by controller 102 is the prior final control block (and therefore the block pointer will have changed). Control then flows to step 566 and operation continues as described above.

Alternatively, should the appending operation be completed after controller 102 reaches step 564, the count will (again) be incremented (by processor 106), but the register in the DMA controller holding the current block pointer will (again) not be changed. Hence, pursuant to revised step 567, controller 102 will wait until the count is updated and then, pursuant to New Step, reread the block pointer (from memory 108) of the block currently being processed. In this instance, the block being processed is the prior final control block since controller 102 has entered the wait state of revised step 567. Control then flows to step 566 and operation continues as described above.

Figure 6A:
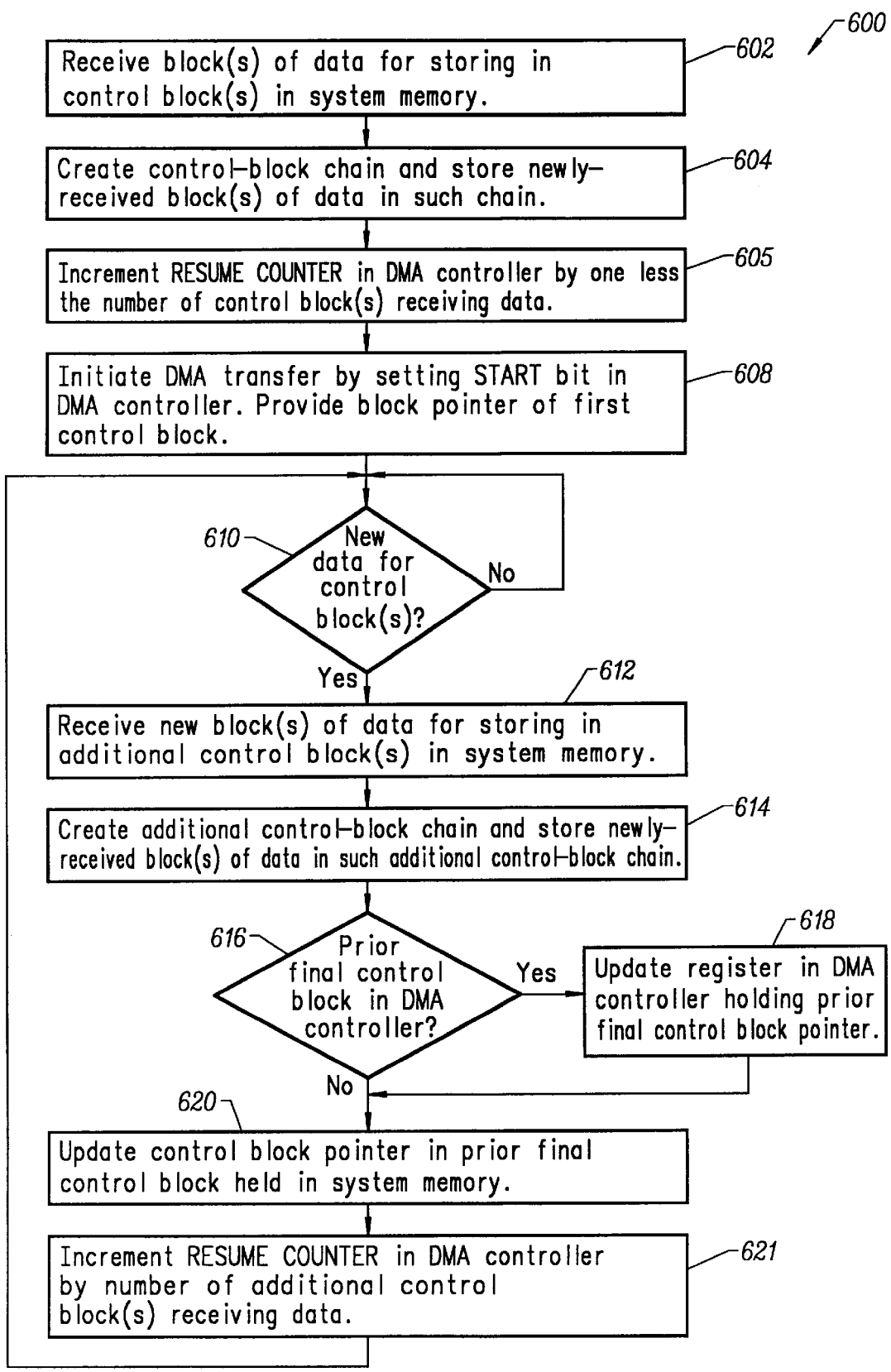
FIGS. 6A and 6B are flow charts of processor and DMA operations, respectively, using a resume counter in accordance with an embodiment of the invention.
Figure 6B:
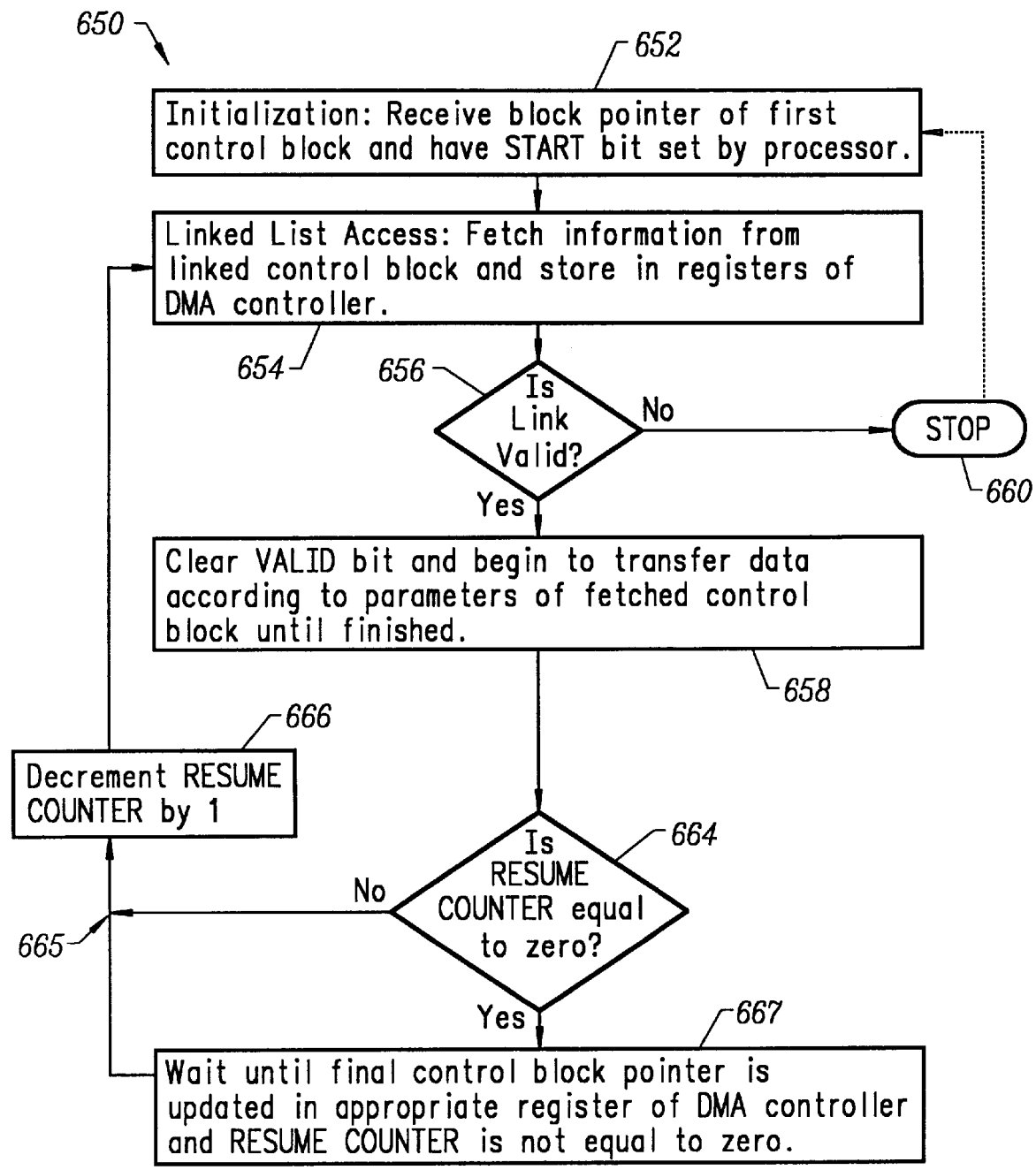

FIGS. 6A and 6B represent methods carried out by microprocessor 106 and DMA controller 102, respectively, to perform DMA operations in accordance with another embodiment of the invention. This embodiment is similar to that disclosed in FIGS. 5A and 5B with the distinction that the embodiment of FIGS. 6A and 6B does not utilize a wait bit. Accordingly, resume counter 104 maintains a count that tracks individual control blocks rather than control-block chains. Many of the flow-chart steps provided in FIGS. 6A and 6B are identical to those of FIGS. 5A and 5B, respectively; such identical steps being identified by like reference numerals incremented by one hundred. The descriptions of these steps provided above with respect to FIGS. 5A and 5B (or 3B) apply equally to those shown in FIGS. 6A and 6B, respectively. Hence, only the differences between these two sets of flow charts will be described.

Referring to FIG. 6A, microprocessor 106 carries out operations like those described in FIG. 5A with the exception that steps 506 and 522 are removed and replaced with steps 605 and 621, and step 616 is carried out differently from step 516 since no wait bit is available. In the method provided in FIG. 6A, operations pertaining to the wait bit are deleted and the count held by counter 104 is modified to represent the number of individual control blocks rather than the number of control-block chains that remain pending. Accordingly, pursuant to step 605, processor 106 initially increments the count maintained by resume counter 104 disposed in controller 102 by one less the number of control block(s) receiving data pursuant to step 604. Thereafter, operation continues as set out above in connection with FIG. 5A until reaching step 616, wherein processor 106 may rely exclusively on the count (since the wait bit is unavailable) to determine whether a "prior final control block" is retained in the DMA controller 101 (which would be the case if the count equals zero).

Thereafter, operation continues as set out above in connection with FIG. 5A until reaching step 621. In this instance, again no processing directed to the wait bit is required since this has been deleted and, instead, the count maintained by resume counter 104 is increased by the number of additional control block(s) that receive data.

Referring to FIG. 6B, controller 102 carries out the same operations as set out in FIG. 5B except for step 562 directed to the processing of a wait bit. Since a wait bit is not included in the embodiment of FIGS. 6A and 6B, this step is removed from the operation. As such, the count maintained by counter 104 records the number of control blocks that remain to be processed for a given DMA operation. Accordingly, removal of the wait bit results in greater dependence on the count value maintained by resume counter 104 since there is no longer an indication of when the end of a given chain has been reached. Accordingly, the embodiment of FIG. 6B requires more frequent processing of the count maintained in counter 104 than the embodiment of FIG. 5B. Specifically, method 650 requires the count to be checked after completing a data transfer operation associated with every control block and decrementing this value after every such control block except the last.

An alternative embodiment to the methods shown in FIGS. 5A and 5B is described above where controller 102 performs a reread operation to update a block-pointer register in the controller. The same alternative embodiment is available for the methods of FIGS. 6A and 6B. To achieve this alternative embodiment, method 600 of FIG. 6A is revised by removing steps 616 and 618. Additionally, method 650 of FIG. 6B is revised by inserting the New Step (described above) between junction 665 and step 666, and revising step 667 to read: "Wait until RESUME COUNTER is not equal to zero." The foregoing description of these steps in connection with FIGS. 5A and 5B apply equally to FIGS. 6A and 6B.

While the foregoing is a complete description of the embodiments of the invention, various modifications, alternatives and equivalents may be used. For example, processor 106 may be used to modify the count retained by resume counter 104 (i.e., reduce its value) to force controller 102 to enter a wait state prior to completion of a given DMA operation. This will facilitate a suspension of DMA operations mid-stream for any purpose deemed desirable by the programmer (e.g., trouble shooting). Operation may thereafter resume by again modifying the count (i.e., increase its value) to represent the number of chains remaining to be processed. Accordingly, the above description should not be taken as limiting the scope of the invention which is defined by the appended claims.

What is claimed is:

1. A system for transferring data comprising:

a data bus;

a controller that effects a transfer of data on said data bus, said controller operating in accordance with a current control block containing data-transfer parameters;

a processor coupled to said controller, said processor providing one or more new control blocks comprising a control-block chain while said controller is effecting said transfer of data in accordance with said current control block, said one or more new control blocks being accessed by said controller after said current control block;

a counter disposed in said controller, said counter maintaining a current count associated with said one or more new control blocks and representing a number of remaining control-block chains to be processed.

2. The system of claim 1 further comprising a memory, wherein said processor preallocates a portion of said memory for holding all anticipated control blocks of the system.

3. The system of claim 2 wherein said portion of said memory contains a plurality of control block pointers that predefine a linked-list relationship among said all anticipated control blocks of the system.

4. The system of claim 1 wherein each control block contains a wait bit, said wait bit indicating a last control block in a control-block chain.

5. The system of claim 4 wherein said current control block and said one or more new control blocks are collectively configured as a linked list.

6. The system of claim 5 wherein said each control block further contains a data pointer, a block pointer, and a valid bit.

7. A method for performing a data transfer under the control of a DMA controller comprising:

preallocating a portion of memory to hold a plurality of anticipated control blocks, said plurality of anticipated control blocks being associated through a pre-defined linked list;

generating an initial control-block chain from a first portion of said anticipated control blocks;

transferring data in accordance with data-transfer parameters disposed in said initial control-block chain;

generating another control-block chain from a second portion of said anticipated control blocks;

incrementing said count value once to represent said another control-block chain;

checking said count value to determine whether any other control blocks in said another control-block chain are awaiting processing after effecting data transfer in accordance with said initial control-block chain; and continuing data transfer when said count value indicates other control blocks are awaiting processing, and otherwise waiting for said other control blocks to be generated.

8. The method of claim 7 wherein continuing data transfer comprises:

decrementing said count value; and fetching new data-transfer parameters from said other control blocks awaiting processing.

9. The method of claim 7 wherein each control block of said initial control-block chain contains a wait bit, said wait bit being set only in a final control block of said initial control-block chain; and wherein said checking a count value is performed only after determining said wait bit is set.

10. A method for performing a data transfer under the control of a DMA controller comprising:

preallocating a portion of memory to hold a plurality of anticipated control blocks, said plurality of anticipated control blocks being associated through a pre-defined linked list;

generating an initial control-block chain from a first portion of said anticipated control blocks;

transferring data in accordance with data-transfer parameters disposed in said initial control-block chain;

generating another control-block chain from a second portion of said anticipated control blocks, said another control-block chain containing a plurality of control blocks;

incrementing a count value a number representing said plurality of control blocks;

checking said count value to determine whether any other control blocks in another control-block chain are awaiting processing after effecting data transfer in accordance with said initial control-block chain; and continuing data transfer when said count value indicates other control blocks are awaiting processing, and otherwise waiting for said other control blocks to be generated.

11. A system for transferring data comprising:

a memory that holds a plurality of complete control blocks, said plurality of complete control blocks being organized into a plurality of control-block chains;

a processor coupled to said memory, said processor reallocating a portion of said memory for holding anticipated control blocks, said anticipated control blocks are associated through a pre-defined linked list and used to create said plurality of complete control blocks;

a device, coupled to said memory, capable of storing data;

a DMA controller that effects a transfer of data between said memory and said device, said controller operating in accordance with one of said plurality of complete control blocks; and a counter, disposed in said DMA controller, that contains a count indicating a quantity of remaining control-block information to be processed, said processor incrementing said count when a new control-block chain is appended to said plurality of control-block chains.

12. The system of claim 11 wherein said DMA controller checks and decrements said count when one of said plurality of control-block chains is about to be newly accessed.

13. The system of claim 12 wherein each of said control blocks includes a wait bit, said wait bit operable to indicate a last control block in a given control-block chain and thereby trigger said DMA controller to check said count.

* * * * *